United States Patent [19]

Komurasaki et al.

[11] Patent Number: 4,680,529
[45] Date of Patent: Jul. 14, 1987

[54] APPARATUS FOR CONTROLLING GENERATOR FOR VEHICLE

[75] Inventors: Keiichi Komurasaki; Shiro Iwatani; Shinji Nishimura, all of Himeji, Japan

[73] Assignee: Mitsubishi Denki Kabushiki Kaisha, Japan

[21] Appl. No.: 866,979

[22] Filed: May 27, 1986

[30] Foreign Application Priority Data

May 31, 1985 [JP] Japan ............................. 60-82742[U]

[51] Int. Cl.⁴ ........................... H02J 7/14; H02P 9/10
[52] U.S. Cl. ....................................... 322/28; 320/64; 322/14
[58] Field of Search ........................ 322/14, 28, 29, 32, 322/72, 73, 100, 15, 8; 320/64

[56] References Cited

U.S. PATENT DOCUMENTS

| | | | |
|---|---|---|---|
| 3,771,821 | 11/1973 | Rist et al. ............................ | 322/14 X |
| 3,918,543 | 11/1975 | Halem ................................. | 62/323.4 |
| 4,322,630 | 3/1982 | Mezera et al. ..................... | 240/40 C |
| 4,368,417 | 1/1983 | Matsuyama ........................ | 320/64 X |
| 4,386,310 | 5/1983 | Sievers ................................ | 322/28 |
| 4,459,489 | 7/1984 | Kirk et al. .......................... | 322/8 X |
| 4,536,697 | 8/1985 | Johnston et al. .................... | 322/14 |
| 4,612,493 | 9/1986 | Katashima et al. ................. | 320/64 |

FOREIGN PATENT DOCUMENTS 59-213239 12/1984 Japan .

Primary Examiner—R. J. Hickey
Attorney, Agent, or Firm—Leydig, Voit & Mayer

[57] ABSTRACT

An apparatus for controlling a generator for a vehicle for limiting the output current of the generator by controlling the field current of the generator having an operating state detector for detecting the operating state of the vehicle, a reference clock generator, a modulator for modulating the reference clock pulses for generating reference clock pulses in response to the output of the operating state detector to sequentially vary the field current.

4 Claims, 2 Drawing Figures

APPARATUS FOR CONTROLLING GENERATOR FOR VEHICLE

BACKGROUND OF THE INVENTION

This invention relates to an apparatus for controlling vehicle generators.

In a prior-art apparatus such as disclosed in Japanese Patent Application Laid-open No. 59-213239 (laid-open on Dec. 3, 1984) entitled "APPARATUS FOR CONTROLLING GENERATOR FOR VEHICLE" filed by Nihon Denso K.K., Japan control, means are provided for removing a torque required to drive a vehicle generator from engine when the vehicle is accelerated to reduce the load on the engine, and this control means is effective to gradually vary the regulated voltage of a voltage regulator for controlling the output voltage of the generator. Thus, the control means can prevent a battery from instantaneously flowing a large current to protect the battery.

In the prior-art apparatus, a large output current flows instantaneously from the generator as the charging current to the battery when the output voltage of the generator becomes higher than the voltage of the battery. Thus, the battery cannot be protected, and when the output voltage of the generator is controlled to reduce the load on the engine, the output current of the generator takes various values according to the state of the electric load of the vehicle, i.e., the state of the battery. Thus, the load cannot be adequately reduced, and there arises a disadvantage that the output voltage always decreases during the quick acceleration detection to cause the battery to discharge.

SUMMARY OF THE INVENTION

This invention eliminates such disadvantage of the prior-art apparatus. An object of this invention is to provide an apparatus for controlling a generator for a vehicle which prevents a battery from instantaneously flowing a large current to protect the battery, adequately reduces the load of an engine in the operating state of the vehicle at accelerating time, and does not discharge the battery even at the time of detecting such as at the accelerating time.

The apparatus for controlling a generator for a vehicle according to this invention modulates a reference clock at the time of detecting the accelerating state of the vehicle, sequentially varies the field current of the generator by the modulated output, and limits and varies the maximum output current of the generator.

DESCRIPTION OF THE PREFERRED EMBODIMENT

Figure 1:
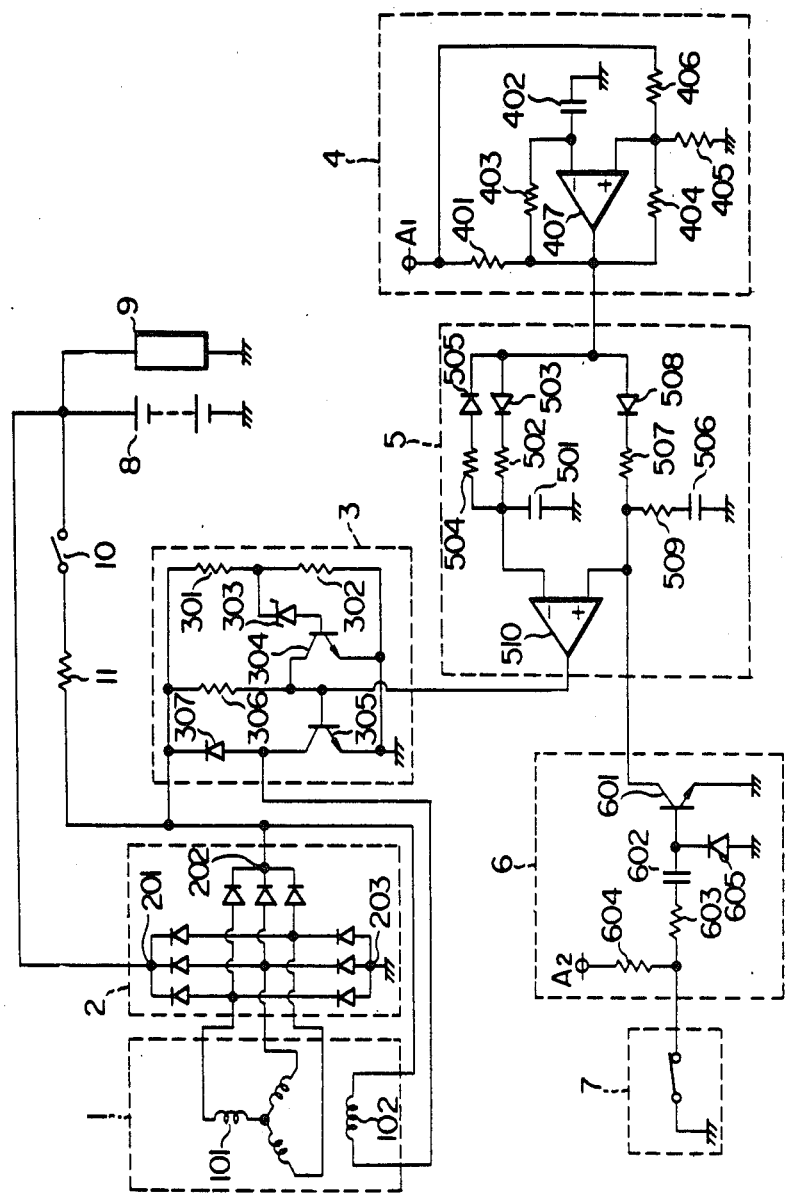
FIG. 1 is a circuit diagram showing an embodiment of an apparatus for controlling a generator for a vehicle according to this invention.

Now, an embodiment of this invention will be described with reference to the drawings. In FIG. 1, numeral 1 designates a generator driven by an engine (not shown), which has an armature coil 101 and a field coil 102. Numeral 2 designates a rectifier for full-wave rectifying the A.C. output of the generator 1, which has output terminals 201, 202 and 203, wherein the terminal 201 is an output terminal for supplying a current to a battery 8 and a load 9, the terminal 202 is an output terminal for exciting the field coil 102 and detecting the voltage of a voltage regulator 3 to be described in detail later, and the terminal 203 is an output terminal for grounding. Numeral 3 designates a voltage regulator for regulating the output voltage of the generator 1 to a predetermined value, and which has various components as will be described. Numerals 301 and 302 designate voltage dividing resistors for dividing the output voltage of the output terminal 202 of the rectifier 2, numeral 303 designates a Zener diode for detecting the output voltage of the output terminal 202 of the rectifier 2 to be energized when the output voltage becomes higher than a predetermined value, numeral 304 designates a transistor conducted when the Zener diode 303 is energized to control to interrupt a transistor 305 to be described later. Numeral 305 designates a transistor for controlling to interrupt the field coil 102 of the generator 1, numeral 306 designates the base resistor of the transistor 305, and numeral 307 designates a diode connected in parallel with the field coil 102 of the generator 1 for absorbing the interrupting surge of the field coil 102.

Numeral 4 designates a reference clock generator, which has components to be described later. Symbol $A_1$ denotes a power source, numeral 401 designates a current limiting resistor, numeral designates a capacitor, one terminal of which is connected to the (−) input of a comparator 407 to be described later. Numeral 403 designates a resistor for charging and discharging the capacitor 402, numerals 404, 405 and 406 designate resistors connected at the voltage dividing point to (+) input of the comparator 407 to be described later to output a reference voltage. Numeral 407 designates a comparator for comparing (+) and (−) input voltages and outputting a rectangular wave.

Numeral 5 designates a modulator having a capacitor 501, one terminal of which is connected to (−) input of a comparator 510, a charging resistor 502 for charging the capacitor 501 when the output of the reference clock generator 4 is "H" level, a discharging resistor 504 for discharging the capacitor 501 when the output of the generator 4 is "L" level, and reverse current preventing diodes 503, 505. Numeral 506 designates a capacitor, one terminal of which is connected through a resistor 509 to be described later to (+) input of a comparator 510. Numerals 507 and 509 designate charging resistors for charging the capacitor 506 when the output of the generator 4 is "H" level. Numeral 508 designates a reverse current preventing diode, and the comparator 510 is provided for comparing (+) and (−) input voltages to modulate the pulse width of the rectangular wave of the generator 4. In this embodiment, the comparator 510 uses a high impedance element for not affecting the influence to the charging and discharging of the capacitors 501 and 506 such as, for example, a FET input comparator. The output terminal of the comparator 510 is connected to the base of the transistor 305 of the voltage regulator 3. Numeral 7 designates an acceleration switch coupled with the accelerator pedal of a vehicle, which is normally closed, and constructed to open when detecting the acceleration.

Numeral 6 designates an acceleration detector, which has components to be described later. Symbol $A_2$ denotes a power source. Numeral 601 designates a transistor, the collector of which is connected to the connecting point of the resistors 507, 507 of the modulator 5 to form a discharging circuit of the capacitor 506 through the resistor 509. Numeral 602 designates a capacitor, numeral 603 designates a resistor for charging and discharging the capacitor 602, and numeral 604 designates a resistor for charging the capacitor 602 connected through the resistor 603 to the capacitor 602, and the connecting point of the resistors 604 and 603 is connected to the acceleration switch 7, and normally grounded at the normal time. Numeral 605 designates a diode for discharging to form a discharge circuit of the capacitor 605 through the resistor 603 and the switch 7.

Numeral 8 designates a battery mounted in the vehicle, numeral 9 designates various electric loads of the vehicle, numeral 10 designates a key switch, and numeral 11 designates a resistor for initially exciting to initially excite the field coil 102 of the generator 1.

Figure 2:
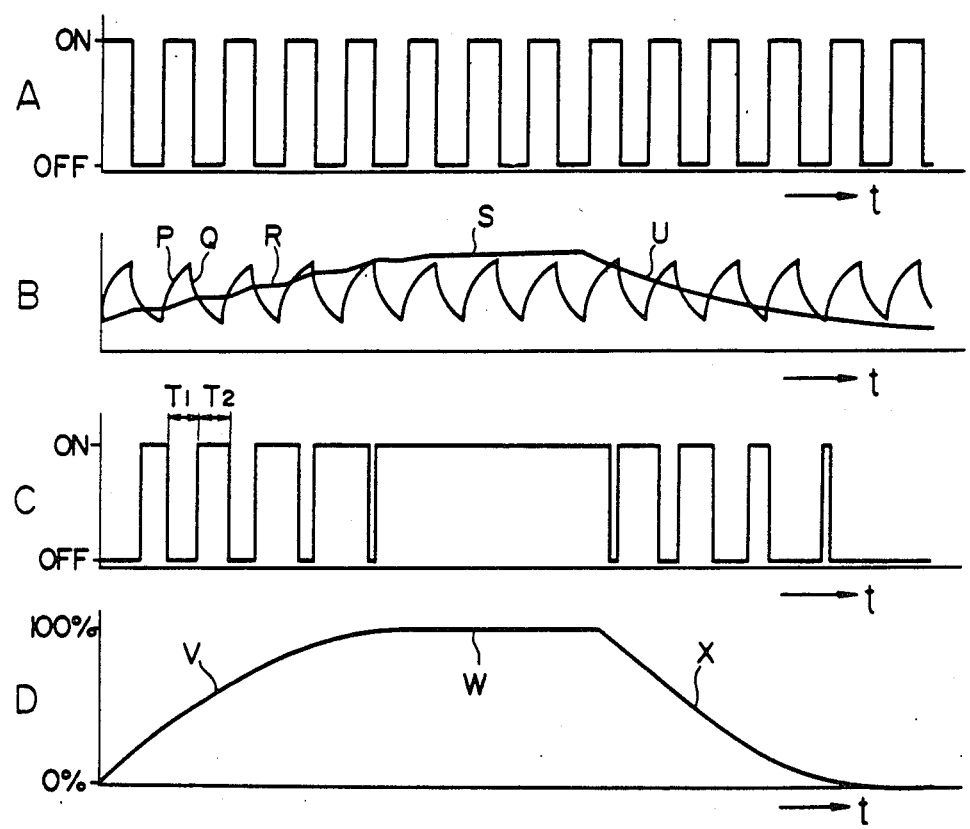
FIGS. 2A to 2D are schematic characteristic diagrams of output waveforms of the units of the apparatus according to this invention.

FIGS. 2A to 2D show output waveforms of various units, wherein abscissa axis all represents time. FIG. 2A shows the rectangular wave output waveform of the reference clock generator 4, and an ordinate axis represents a voltage.

FIG. 2B shows the charging and discharging waveforms of the capacitors 501 and 506 of the modulator 5, and an ordinate axis represents a voltage.

FIG. 2C shows the modulation output waveform of the modulator 5, and an ordinate axis represents a voltage.

FIG. 2D shows a curve representing the variation in the conduction rate of the transistor 305, and an ordinate axis represents a conduction rate.

The operation of the apparatus of the invention will be described. The operation of the voltage regulator 3 will be first described in the case that the output of the comparator 510 of the modulator 5 is "H" level.

When a key switch 10 is closed in case that an engine (not shown) is started, an initial exciting current is flowed from the battery 8 through the key switch 10 and the resistor 11 to the field coil 102 of the generator 1 so that the generator 1 becomes capable of generating. When the engine is then started, the generator 1 starts generating, the voltage regulator 3 receives the output voltage of the output terminal 202 of the rectifier 2, and when the output voltage exceeds a predetermined break-down voltage value set in advance, the Zener diode 303 is energized to connect the base of the transistor 304 to the common node between the resistors 301 and 302. Since the collector of the transistor 304 is effectively at the output voltage of the generator, the forward bias across the collector and base of the transistor 304 causes the transistor 304 to conduct. When the transistor 304 conducts, the base voltage of the transistor 305 drops to zero and the transistor 305 has a forward collector to base bias and is turned on, causing current to flow through the generator field winding. As the output voltage of the generator continues to rise to a level above the predetermined desired regulated voltage, the base voltage of the transistor 304 is caused to rise above the emitter voltage, resulting in a reverse bias that turns the transistor 304 off. That results in turning the other transistor 305 off and interrupts the field current. As the output voltage of the generator drops below a predetermined desired regulated voltage, the base voltage of the transistor 304 is caused to drop below the emitter voltage, resulting in a forward bias that turns the transistor 304 on, which results in turning the other transistor 305 on and causes current to flow in the field winding, thus maintaining the output voltage of the generator within a narrow regulated range. When the output voltage becomes lower than the predetermined value, the Zener diode 303 becomes interrupted, and the transistor 304 is disabled. The transistor 305 is controlled by the transistor 304 to interrupt the field coil 102 of the generator 1, thereby regulating the output voltage of the generator 1 to the predetermined value.

The operation of the acceleration detector 6 will be described.

The acceleration switch 7 is first closed. In other words, when the vehicle is not accelerated, the connecting point of the resistors 603 and 604 is grounded through the switch 7. Thus, the base current is not supplied to the transistor 601, and the transistor 601 is turned off. When the vehicle is accelerated and the switch 7 is opened, a charging current flows from the power source $A_2$ through the resistors 604 and 603 to the capacitor 602, a current is supplied to the base of the transistor 601, and the transistor 601 is turned on. However, the charging current of the capacitor 602 decreases by the time constant determined by the resistors 604 and 603 and the capacitor 602 with the result that the base current of the transistor 601 decreases and the transistor 601 is eventually turned off. Thus, the transistor 601 is so set as to be turned on for a predetermined period of time from the detection of acceleration.

When the acceleration switch 7 is then closed again, charge stored in the capacitor 602 is discharged in the circuit of the resistor 603, the switch 7 and the diode 605 to return to the initial state.

Then, the operations of the reference clock generator 4 and the modulator 5 will be described with reference to FIGS. 2A to 2D.

The reference clock generator 4 is a free-running multivibrator known per se using a comparator. The generator operates to gradually increase the voltage of (−) input of the comparator 407 charged through the resistors 401 and 403 from a power source $A_1$ when the comparator 407 is "H" level. When the voltage exceeds the voltage divided by the resistors 401, 404, 406 and 405 from the power source $A_1$, the output of the comparator 407 is inverted to become "L" level. When the output becomes "L" level, the capacitor 402 starts discharging through the resistor 403 to the output terminal of the comparator 407, and the voltage of (−) input of the comparator 407 gradually decreases. When this voltage becomes lower than the voltage divided by the resistors 406 and 404, 405 from the power source $A_1$, the output of the comparator 407 is again inverted to become "H" level. Then, this operation is repeated. This output waveform is shown in FIG. 2A as rectangular waves. The voltage from the power source is supplied simultaneously when the key switch is closed ON to always output reference clock pulses during the operation.

The operation of the modulator 5 will be then described in the case that the transistor 304 of the voltage regulator 3 and the transistor 601 of the acceleration detector 6 are turned off. The capacitor 501 raises the voltage of the (−) input of the comparator 510 charged through the diode 503 and the resistor 502 when the output of the reference closk pulse generator 4 is "H" level. The rising curve follows the portion P in FIG. 2B. When the output of the reference clock pulse generator 4 then becomes "L" level, the capacitor 501 starts discharging through the resistor 504 and the diode 505 to decrease the voltage of (−) input of the comparator 510. The decreasing curve follows the portion Q in FIG. 2B. While the reference clock generator is operating, the abovementioned operation is always repeated, with the result that a sawtooth wave as shown in FIG. 2B is continuously generated. On the other hand, the capacitor 506 is charged through the diode 508 and the resistors 507, 509 when the output of the generator 4 is at the "H" level, and since no discharging circuit is provided at the "L" level time, the charge remains as it is. In other words, the capacitor 506 is charged whenever the output of the reference clock generator 4 is "H" level, and is gradually charged, with the result that the voltage of (+) input of the comparator 510 is gradually raised. The raising curve becomes a curve shown by the portion R in FIG. 2B. The charge of the capacitor 506 is stored, and will be soon fully charged, and the (+) input voltage of the comparator 510 becomes stable. This is shown by the curve of the portion S in FIG. 2B, and set to the voltage exceeding the peak of the sawtooth wave of the (−) input of the comparator 510 as the ordinary state. When the detector 6 is operated in this state, the transistor 601 is turned on, the capacitor 506 forms a discharging circuit with the resistor 509 and the transistor 601 and is caused to start discharging, and the (+) input voltage of the comparator 510 gradually decreases. The input voltage curve has the shape of the dropping portion U in FIG. 2B.

The comparator 510 operates to output the "H" level when the (+) input voltage is higher than the (−) input voltage and to output the "L" level when the (+) input is less than the (−) input voltage, and the sawtooth wave of (−) input of the comparator 510 and the rising and dropping curves of the (+) input are combined to obtain the output waveform of the comparator 510 modulated in the pulse width of the rectangular wave in FIG. 2A of the reference clock as shown in FIG. 2C. In other words, when the (+) input voltage of the comparator 510 rises at the portion R of the curve in FIG. 2B, the output of the comparator 510 becomes gradually shorter in the time $T_1$ of "L" level as shown in FIG. 2C and gradually longer in the time $T_2$ of "H" level. When the (+) input voltage becomes the ordinary state S, the "H" level is always output. When the (+) input drops along the portion of the curve, the time of "L" level gradually increases in length contrary to the rising time. The output of the comparator 510 is connected to the base of the transistor 305 of the voltage regulator 3 and to the emitter of the transistor 304, as clearly shown in FIG. 1, to control the operation of the transistor 304 which is used to control the transistor 305. In other words, when the output of the comparator 510 is "H" level, the operations of the transistor 304 and the transistor 305 are not affected, and when the output of the comparator 510 is an "L" level, the voltage at the collector of the transistor 304 is dropped to the "L" level, resulting in a reverse emitter to base bias of the transistor 304 and turning the transistor 304 off. When the transistor 304 is turned off, the transistor 305 is also turned off to interrupt the current through the field coil of the generator. Thus, when the voltage transmitted from the comparator to the transistor 304 is at an "H" level, the transistor 305 is turned on, and interrupted when at an "L" level. The conduction rate due to the interruption of the transistor 305 becomes the curve of the portion in FIG. 2D. In other words, when the (+) input voltage of the comparator 510 rises at the curve of the portion R in FIG. 2B, the conduction rate gradually increases at the curve of the portion V, and when the conduction rate becomes the ordinary state of the portion S, the conduction rate of the portion W becomes 100%. When the conduction rate drops at the curve of the portion U, it gradually decreases at the curve of the portion X and eventually becomes 0%, and after the predetermined time, it again rises at the curve of the portion V. The increase and decrease in the conduction rate of the transistor 305 limit the current flowed to the field coil 102 of the generator 1 to increase or decrease the current, with the result that the maximum output current and the maximum drive torque of the generator 1 can gradually increase or decrease in accordance with the curve in FIG. 2D. If the electric load of the vehicle is less than the maximum output current of the generator 1 at a certain conduction rate, there is a margin in the generating capacity of the generator 1. Thus, the output voltage of the generator 1 rises. In this case, as has been previously described, the voltage regulator 3 operates to regulate the output voltage of the generator 1 to a predetermined value by further controlling to interrupt the transistor 305 even when the output of the comparator 510 is at the "H" level and the "H" level pulse is supplied to the collector terminal of the transistor 304, since the transistor 304 will be turned off if the output voltage exceeds the predetermined value. More particularly, in the units in the apparatus of the invention, the output of the modulator 5 is always set at the "H" level and, the regulator 3 is not affected by the presence of the "H" level pulse on the collector terminal of the transistor 304 but controls the output voltage of the generator 1 to the predetermined value. The modulator 5 starts variably interrupting by detecting the acceleration of the vehicle and limits the output current of the generator to gradually decrease the output to eventually produce no output. After this state has elapsed for a predetermined time, the maximum output current of the generator is again limited to gradually increase to return to the ordinary state. In other words, in this apparatus, since the output current of the generator is gradually increased or decreased, it can prevent the battery from being abruptly charged or discharged and can adequately control the increase or decrease in the drive torque of the generator. Further, since the output of the generator is stopped during a predetermined time after acceleration is detected, i.e., while the torque of the engine of the vehicle rises to a predetermined value, it does not discharge the battery and can efficiently exclude the drive torque of the generator.

In the embodiment described above, the acceleration detector is provided and the output of the generator is eliminated for a predetermined time after the acceleration is detected. However, the invention is not limited to the particular embodiment. For example, the minimum output current of the generator is set to a predetermined value, i.e., the lower limit of the conduction rate may be set to a predetermined value, or the output may be always set to the predetermined value during the detection of acceleration.

According to this invention as described above, the field current is gradually varied by the variable output of the conduction rate by the modulator when the operating state such as the accelerating time of the vehicle is detected, and the output current of the generator is gradually varied. Therefore, the apparatus can prevent the battery from abruptly charging or discharging, and can suitably reduce the drive torque of the generator. Further, the drive torque of the generator can be efficiently excluded only when the torque of the engine is required, and the battery is not wastefully discharged.

What is claimed is:

1. A control apparatus for a vehicle generator having an output voltage connected to a battery, said apparatus controlling the output voltage of the generator by controlling the field winding current of the generator comprising:
    an operating state detector for detecting an operating state of said vehicle and for generating an output signal representative thereof,
    a reference clock generator for producing reference clock pulses,
    regulator means connected to the field winding for varying the field current and controlling the output voltage of said vehicle generator to a predetermined regulated value in accordance with modulated reference clock pulses, and
    a modulator means operated responsive to an output signal from said operating state detector for gradually changing the width of the reference clock pulses upon the occurrence of said operating state for gradually varying the field current to gradually reduce the output voltage of the generator connected to the battery over a predetermined period after the occurrence of the operating state of said vehicle.

2. An apparatus for controlling a generator for a vehicle according to claim 1 wherein said regulator means comprises a voltage regulator for the generator having a switching transistor connected to the field winding wherein pulse-width-modulated reference clock pulses are supplied directly to the switching transistor, which interrupts the field current in accordance with the changing pulse widths.

3. An apparatus for controlling a generator for a vehicle according to claim 1 wherein said modulator means modulates the reference clock pulses for a period after the termination of the operating state detected by said detector to gradually increase the output of the generator over a second predetermined time period after the termination.

4. An apparatus for controlling a generator for a vehicle according to claim 3 wherein said modulator means produces pulse-width-modulated reference clock pulses having gradually varying pulse widths for the predetermined period after the occurrence of the operating state and for the second predetermined period after the termination of the operating state of said vehicle is detected by said detector means.

* * * * *